J. P. COPLAND.
VEHICLE WHEEL.
APPLICATION FILED NOV. 2, 1916.
1,357,615.
Patented Nov. 2, 1920.
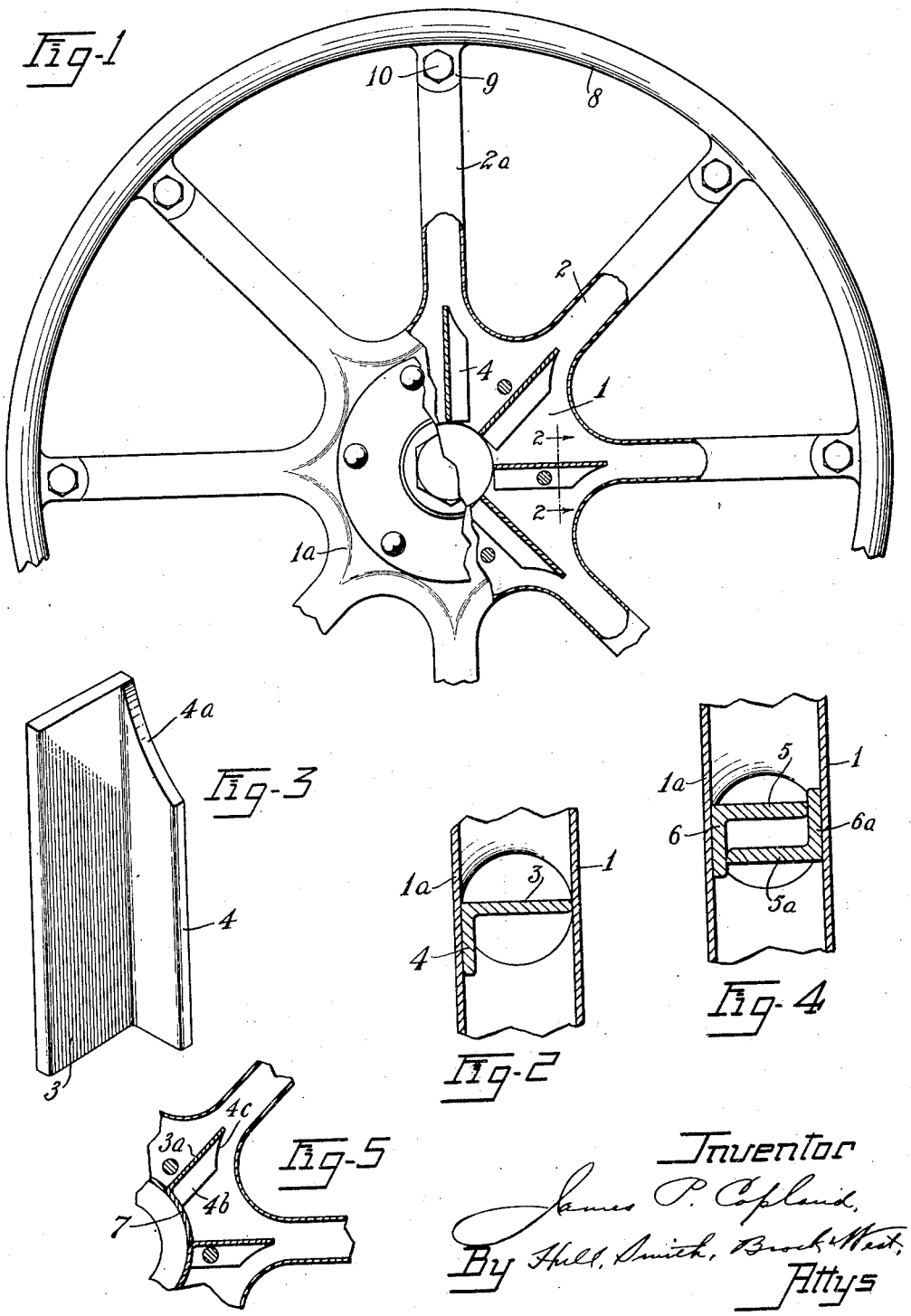

UNITED STATES PATENT OFFICE.

JAMES P. COPLAND, OF CLEVELAND, OHIO, ASSIGNOR TO THE HYDRAULIC STEEL COMPANY, OF CLEVELAND, OHIO, A CORPORATION OF OHIO.

VEHICLE-WHEEL.

1,357,615.

Specification of Letters Patent.

Patented Nov. 2, 1920.

Application filed November 2, 1916. Serial No. 129,067.

*To all whom it may concern:*

Be it known that I, JAMES P. COPLAND, a citizen of the United States, residing at Cleveland, in the county of Cuyahoga and State of Ohio, have invented a certain new and useful Improvement in Vehicle-Wheels, of which the following is a full, clear, and exact description, reference being had to the accompanying drawings.

This invention relates to vehicle wheels, and more particularly to pressed metal wheels which are formed from two symmetrical sheet metal side members or sections each comprising a hub plate with hollow spoke projections, each hub plate having an inturned circumferential edge between the spoke projections and the two members or sections being homogeneously united, as by electrically welding the meeting edges of the spoke projections and of the opposed hub plate projections.

As wheels of this character are usually constructed, the hub section, unless suitably reinforced, is weak as compared with the spoke section and, if there is any tendency for the wheels to collapse, this tendency exists in the hub sections. It has been proposed to obviate this weakness by the interposition of wooden blocks between the side or hub plates, but the use of these blocks is expensive and the wood thereof is liable to be charred while the wheel is subjected to the heat of enameling. It is the general purpose and object of this invention to provide the hub sections of wheels of the character referred to with a simple form of reinforcement which is capable of being easily inserted within such sections, which will withstand all ordinary incidents of use, and which will not be detrimentally affected by the enameling process referred to.

I realize the foregoing purpose and object in and through the construction illustrated in the drawings forming part hereof, wherein Figure 1 represents a side elevation of a portion of a wheel constructed in accordance with my invention, one of the hub plates and certain of the spokes being broken away; Fig. 2 is a sectional detail corresponding to the line 2—2 of Fig. 1; Fig. 3 a perspective view of one of the reinforcing members; Fig. 4 a view, similar to Fig. 2, showing a modification of the reinforcing members; and Fig. 5 a sectional detail of a portion of the hub and spokes and showing a still further modification of the reinforcing member.

Describing by reference characters the various parts illustrated herein, 1 and $1^a$ denote generally the opposed side members or sections of a wheel, each member comprising a hub plate having hollow half-spoke projections 2 and $2^a$ respectively, the edges of the hub portions or plates of said members intermediate the spokes being turned inwardly. The inturned edges of the hub plates and the abutting side edges of the spoke projections may then be united homogeneously, a convenient manner of accomplishing this result being by electrically welding the parts together.

In order to enable the hub portion proper to withstand lateral strains such as are induced by skidding or by the wheel encountering a curb or similar obstruction, before uniting the symmetrical halves of the wheel, I insert in one of these halves or sections reinforcing members each preferably consisting of an angle iron brace, said brace comprising a web, shown as a flange 3, and a shorter web or flange 4 projecting at right angles from the first mentioned flange. The flange 3 is of such length as to extend outwardly from a point close to the center of the hub to a short distance into the hollow interior of a spoke, the flange 3 being preferably in the plane of a radius drawn from the hub through the axis of the spoke. The flange 4 is cut away at its outer end, as indicated at $4^a$, in such a manner as to provide a curved beveled surface, this curved surface corresponding with the curvature of the line defining the junction of the rounded surface of the hub and spokes with the flat central portion thereof, thereby providing a flat bearing and an intimate contact between the flange 4 and the face of the adjacent hub plate. The reinforcing members may be first spot-welded, through their flanges 4, to one of the symmetrical halves of the wheel and, after the two halves have been united in the manner described hereinbefore, said members will be spot-welded to the opposite wheel member.

In Fig. 4 there is shown a modification of my invention wherein each reinforcing member comprises a pair of angle iron members having the flanges 5 and 6, $5^a$ and $6^a$, respectively, said flanges corresponding to the flanges 3 and 4 of the single reinforcing members hereinbefore described, the flanges 6 and 6ª being cut away at the top in the same manner as the flange 4 of the preceding modification. Each part of the double reinforcing members shown in Fig. 4 may be spot-welded to its hub plate 1, 1ª, so that, when the wheel halves or sections are united in the manner described hereinbefore, a double reinforcing member will be provided having throughout the major portion of its length a box-like section. The webs of the flanges 5 and 5ª will be spaced equidistantly from the center or axis of each spoke.

In Fig. 5 there is shown a still further modification of my invention wherein the reinforcing members are identical with those shown in Figs. 1–3 inclusive except that the flange 3ª has formed therewith a segmental flange 7 which is substantially concentric with the axis of the wheel and which is preferably overhung by the flange 4ᵇ. The outer end of each flange 4ᵇ is cut away, as indicated at 4ᶜ, in the same manner as is the case with the outer ends of the flanges 4. The segmental flanges or projections 7 are of such extent as, when the reinforcing members are in place, to form an annular web extending about the central portion of the hub and extending across the space between the two hub plates.

The rim which coöperates with the outer ends of the spokes may be a fixed rim or felly of standard construction, or it may be a demountable rim 8 detachably secured to the ends of the spokes as by means of lugs 9 and bolts 10, in the manner disclosed in my application No. 98,014, filed May 17, 1916.

In all forms of my invention, while one flange of each reinforcing member forms a transverse brace between the opposite sides of the hub plates and the inner ends of the spoke projections, the outer flange serves as a brace for stresses and strains acting at right angles to the first mentioned flange. In the form shown in Fig. 5, each reinforcing member has an additional segmental flange which reinforces the hub both transversely and circumferentially.

Having thus described my invention, what I claim is:

1. A vehicle wheel comprising a pair of opposed sections each having a central hub plate and radial hollow spoke projections homogeneously united at their lateral edges, and a series of angle iron reinforcing members each having a flange extending radially from the central portion of the space between the hub plates into the interior of a hollow spoke and having its other flange bearing against one of said plates, the outer end of the last mentioned flange being cut away to conform to the curvature of the outer portion of the hub plate and the connected spoke, said members being homogeneously united to the coöperating portions of the wheel.

2. A vehicle wheel comprising a pair of opposed sections each having a hub plate and radial hollow spoke projections homogeneously united at their abutting lateral edges; and a series of angle iron reinforcing members, each having a segmental web or flange adapted to extend across the space between the opposed central portions of the plates, a radial flange extending outwardly from one end of such segmental web into the interior of a spoke and connected at one edge to such spoke, and a flange extending at substantially right angles to the radial flange and united to one of the hub plates.

In testimony whereof I hereunto affix my signature.

JAMES P. COPLAND.